United States Patent
Marrs et al.

(10) Patent No.: US 9,851,796 B2
(45) Date of Patent: Dec. 26, 2017

(54) TACTILE KEYS AND METHODS FOR THEIR PRODUCTION AND USE

(71) Applicant: Empire Technology Development LLC, Wilmington, DE (US)

(72) Inventors: Michael Alan Marrs, Phoenix, AZ (US); Douglas E. Loy, Chandler, AZ (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 418 days.

(21) Appl. No.: 14/482,958

(22) Filed: Sep. 10, 2014

(65) Prior Publication Data

US 2016/0070349 A1    Mar. 10, 2016

(51) Int. Cl.
  *G06F 3/01* (2006.01)
  *G06F 1/16* (2006.01)
  *G06F 3/041* (2006.01)
  *G06F 3/023* (2006.01)
  *H01H 13/00* (2006.01)

(52) U.S. Cl.
  CPC .............. *G06F 3/016* (2013.01); *G06F 3/023* (2013.01); *H01H 13/00* (2013.01)

(58) Field of Classification Search
  None
  See application file for complete search history.

(56) References Cited

U.S. PATENT DOCUMENTS

| 7,336,266 B2 | 2/2008 | Hayward et al. |
| 2011/0128239 A1 | 6/2011 | Polyakov et al. |
| 2012/0092294 A1* | 4/2012 | Ganapathi .......... G02B 26/0833 345/174 |

(Continued)

OTHER PUBLICATIONS

"Developments in Electroactive Polymers immerse users in a high-definition world of tactile experience" on May 14, 2013, Accessed at http://web.archive.org/web/20130927164614/http://www.plastemart.com/Plastic-Technical-Article.asp?LiteratureID=1953&Paper=developments-in-electroactive-polymers-immerse-users-in-a-high-definition-world-of-tactile-experience, Accessed on Jun. 17, 2014.

(Continued)

*Primary Examiner* — Joseph Haley
*Assistant Examiner* — Emily Frank
(74) *Attorney, Agent, or Firm* — Dorsey & Whitney LLP (57) ABSTRACT

Disclosed are tactile keys and methods for their production and use. The tactile key may include a substrate; a conductive layer disposed on at least one region of the substrate; a porous layer disposed on at least a portion of the conductive layer; an insulating layer disposed on regions of the substrate that surround the conductive layer and the porous layer to form a well, the well having sidewalls defined by the insulating layer, and a bottom surface at least partially defined by the porous layer; an electroactive polymer composition disposed in the well; and a flexible layer having a conductive coating on at least a portion of a surface facing the electroactive polymer composition, the flexible layer covering the well and at least a portion of the insulating layer surrounding the well. When the tactile key is depressed, an electric field is activated causing the electroactive polymer composition to move towards the flexible layer to provide a tactile feedback.

27 Claims, 1 Drawing Sheet

(56) References Cited

U.S. PATENT DOCUMENTS

2012/0113021 A1* 5/2012 Liu .................. G06F 3/041
 345/173
2014/0132532 A1* 5/2014 Yairi .................. G06F 3/041
 345/173

OTHER PUBLICATIONS

Banister, S. V. D. K. M., "Development of a PACS Digital Pump™ and Implications for other Industries," Proc. of SPIE, vol. 6527, No. 65270N (2007).

Boyrzac, K., "A Flexible Keyboard with Buttons That Feel Clickable," MIT Technology Review, Apr. 9, 2013, pp. 2.

Goh, C., et al., "Nanostructuring Titania by Embossing with Polymer Molds Made from Anodic Alumina Templates," Nano Letters, vol. 5, No. 8, pp. 1545-1549 (2005).

Guo, D.-L. et al., "Porous Anodic Aluminum Oxide Bragg Stacks as Chemical Sensors," J. Phys. Chem. C, vol. 112, No. 46, p. 17952-17956 (2008).

Masuda, H. and Satoh, M., "Fabrication of Gold Nanodot Array Using Anodic Porous Alumina as an Evaporation Mask," Jpn. J. Appl. Phys., vol. 35, Part 2, No. 1B, pp. L126-L129 (1996).

* cited by examiner

TACTILE KEYS AND METHODS FOR THEIR PRODUCTION AND USE

BACKGROUND

As computers become more prevalent in consumer devices, manufacturers are finding that knobs and dials can be a form of computer interface to conserve valuable space on the device. However, such an interface can be complex in design and may not be as user friendly as a conventional mouse and/or keyboard.

Touchscreen keypads have been integrated into displays of consumer devices as an alternative to separately consuming valuable space on the device. However, touchscreen keypads lack the expected tactile cues that can be sensed from using a conventional mouse and/or keyboard. The lack of tactile cues can lead to errors when selecting keys on the touchscreen keypad, which can be frustrating to the user.

It will therefore be desirable to provide tactile feedback in touchscreen keypads or touchscreen interfaces.

SUMMARY

Tactile keys are disclosed. The tactile key may include a substrate; a conductive layer disposed on at least one region of the substrate; a porous layer disposed on at least a portion of the conductive layer; an insulating layer disposed on regions of the substrate that surround the conductive layer and the porous layer to form a well, the well having sidewalls defined by the insulating layer, and a bottom surface at least partially defined by the porous layer; an electroactive polymer composition disposed in the well; and a flexible layer having a conductive coating on at least a portion of a surface facing the electroactive polymer composition, the flexible layer covering the well and at least a portion of the insulating layer surrounding the well.

Devices including at least one tactile key are also disclosed. The tactile key includes a substrate; a conductive layer disposed on at least one region of the substrate; a porous layer disposed on at least a portion of the conductive layer; an insulating layer disposed on regions of the substrate that surrounds the conductive layer and the porous layer to form a well, the well having sidewalls defined by the insulating layer, and a bottom surface at least partially defined by the porous layer; an electroactive polymer composition disposed in the well; and a flexible layer having a conductive coating on at least a portion of a surface facing the electroactive polymer composition, the flexible layer covering the well and at least a portion of the insulating layer surrounding the well.

Keyboards including at least one tactile key are also disclosed. The tactile key includes a substrate; a conductive layer disposed on at least one region of the substrate; a porous layer disposed on at least a portion of the conductive layer; an insulating layer disposed on regions of the substrate that surround the conductive layer and the porous layer to form a well, the well having sidewalls defined by the insulating layer, and a bottom surface at least partially defined by the porous layer; an electroactive polymer composition disposed in the well; and a flexible layer having a conductive coating on at least a portion of a surface facing the electroactive polymer composition, the flexible layer covering the well and at least a portion of the insulating layer surrounding the well.

A device including a keyboard is also disclosed. The keyboard includes at least one tactile key. The tactile key includes a substrate; a conductive layer disposed on a region of the substrate; a porous layer disposed on at least a portion of the conductive layer; an insulating layer disposed on regions of the substrate that surround the conductive layer and the porous layer to form a well, the well having sidewalls defined by the insulating layer, and a bottom surface at least partially defined by the porous layer; an electroactive polymer composition disposed in the well; and a flexible layer having a conductive coating on at least a portion of a surface facing the electroactive polymer composition, the flexible layer covering the well and at least a portion of the insulating layer surrounding the well.

Methods for producing a tactile key are also disclosed. The method includes providing a conductive layer on at least one region of a substrate; providing a porous layer on at least a portion of the conductive layer; providing an insulating layer on regions of the substrate that surround the conductive layer and the porous layer to form a well, the well having sidewalls defined by the insulating layer, and a bottom surface at least partially defined by the porous layer; adding an electroactive polymer composition to the well; and covering the well and at least a portion of the insulating layer surrounding the well with a flexible layer, the flexible layer having a conductive coating on at least a portion of a surface facing the electroactive polymer composition.

Methods of using a device having at least one tactile key are also disclosed. The method includes depressing the at least one tactile key to activate an electric field, wherein the at least one tactile key comprises a substrate; a conductive layer disposed on at least one region of the substrate; a porous layer disposed on at least a portion of the conductive layer; an insulating layer disposed on regions of the substrate that surround the conductive layer and the porous layer to form a well, the well having sidewalls defined by the insulating layer, and a bottom surface at least partially defined by the porous layer; an electroactive polymer composition disposed in the well; and a flexible layer having a conductive coating on at least a portion of a surface facing the electroactive polymer composition, the flexible layer covering the well and at least a portion of the insulating layer surrounding the well; wherein the electric field, when activated, causes the electroactive polymer composition to move towards the flexible layer to provide a tactile feedback.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is related to, among other things, tactile keys, devices and keyboards including one or more tactile keys, and methods for their preparation and use. The tactile key can include a substrate; a conductive layer disposed on at least one region of the substrate; a porous layer disposed on at least a portion of the conductive layer; an insulating layer disposed on regions of the substrate that surround the conductive layer and the porous layer to form a well, the well having sidewalls defined by the insulating layer, and a bottom surface at least partially defined by the porous layer; an electroactive polymer composition disposed in the well; and a flexible layer having a conductive coating on at least a portion of a surface facing the electroactive polymer composition, the flexible layer covering the well and at least a portion of the insulating layer surrounding the well. In some embodiments, the conductive coating contacts the electroactive polymer composition.

The tactile key can, for example, be incorporated into devices, keyboards, or devices that have or use keyboards. The device can for example be a computer, tablet, or cellular telephone. Accordingly, the present disclosure is also related to a device that includes the at least one tactile key as described herein, to a keyboard that includes the at least one tactile key as described herein, and to a device having a keyboard that includes the at least one tactile key as described herein.

Methods for producing a tactile key can include providing a conductive layer on at least one region of a substrate; providing a porous layer on at least a portion of the conductive layer; providing an insulating layer on regions of the rigid substrate that surround the conductive layer and the porous layer to form a well, the well having sidewalls defined by the insulating layer, and a bottom surface at least partially defined by the porous layer; adding an electroactive polymer composition to the well; and covering the well and at least a portion of the insulating layer surrounding the well with a flexible layer, the flexible layer having a conductive coating on at least a portion of a surface facing the electroactive polymer composition. The conductive coating may contact the electroactive polymer composition when the flexible layer covers the well.

For a device that includes the at least one tactile key, the method of using the device can include depressing the at least one tactile key to activate an electric field, wherein the at least one tactile key includes a conductive layer disposed on at least one region of the substrate; a porous layer disposed on at least a portion of the conductive layer; an insulating layer disposed on regions of the substrate that surround the conductive layer and the porous layer to form a well, the well having sidewalls defined by the insulating layer, and a bottom surface at least partially defined by the porous layer; an electroactive polymer composition disposed in the well; and a flexible layer having a conductive coating on at least a portion of a surface facing the electroactive polymer composition, the flexible layer covering the well and at least a portion of the insulating layer surrounding the well, and wherein the electric field, when activated, causes the electroactive polymer composition to move towards the flexible layer (for example, by expanding in volume, bending, or other modes of deformation) to provide a tactile feedback. The method of using the device may further include releasing the at least one tactile key to deactivate the electric field, wherein the electric field, when deactivated, causes the electroactive polymer composition to move away from the flexible layer, for example, return to its original state or volume before the electric field is activated. The tactile key may be depressed by exerting a force onto the flexible layer, and may be released by removing the force from the flexible layer. The tactile key often would be depressed by applying pressure from a user's finger or a stylus, although it can be depressed by other body parts or objects as well.

The electroactive polymer composition may include one or more electroactive polymers. The electroactive polymer can be any polymer that deforms, for example by expanding in volume or by bending, in the presence of an electric field. Suitable electroactive polymers may include ionic electroactive polymers and pH-responsive polymers.

Where the electroactive polymer composition includes one or more ionic electroactive polymers, the electroactive polymer composition can deform towards the flexible layer upon application of an electric field. The electroactive polymer composition can deform towards the flexible layer by bending in various ways. In some examples, one or more end portions of the electroactive polymer composition move towards the flexible layer such that the one or more end portions exert a force on the flexible layer. In other examples, the one or more end portions of the electroactive polymer composition move away from the flexible layer to form a curved surface, such that the curved surface moves towards the flexible layer and exerts a force on the flexible layer. The conductive layer (bottom electrode) and the conductive coating (top electrode) can be configured to form a pair of electrodes that can apply the electric field across the electroactive polymer composition. When the electric field is applied, cations in the ionic electroactive polymer migrate towards a negative electrode. The cations may align near the negative electrode. The re-distribution of the cations can cause the portion of the ionic electroactive polymer nearer the negative electrode to deform toward the negative electrode.

Where the electroactive polymer composition includes one or more pH-responsive polymers, the electroactive polymer composition can expand under an electric field due to pH changes generated by the electric field. The electroactive polymer composition may further include one or more electrolytes. The one or more electrolytes may be in aqueous form, for example, dissolved in water. Alternatively, the one or more electrolytes may be dissolved in one or more non-water solvents, or a mixture of water and one or more non-water solvents (such as methanol, ethanol, glycerol, and so on). Suitable electrolytes include sodium acetate, NaCl, $NaClO_4$, $Na_2SO_4$, $Na_2CO_3$, $NH_4COOH$, $NaHCO_3$, $NH_4HCO_3$, or any combination thereof. The conductive layer (bottom electrode) and the conductive coating (top electrode) can be configured to form an electrolytic cell by disposing the electroactive polymer composition between the conductive coating (top electrode) and the porous layer of the conductive layer (bottom electrode). The conductive layer (bottom electrode) and the conductive coating (top electrode) can each function either as an anode or a cathode. When an electric field is applied across the electroactive polymer composition, a series of electrochemical reactions occur at the anode and at the cathode to cause swelling of the electroactive polymer composition.

At the anode, which is a positive terminal in the electrolytic cell and where electrons exit the aqueous electrolyte solution, oxygen is released from water yielding hydrogen ions and electrons in reaction A:

$$2H_2O \rightarrow O_2 + 4H^+ + 4e^- \qquad (A)$$

The increase in hydrogen ion content results in a lowering of the pH around the anode.

At the cathode, which is the negative terminal of the electrolytic cell, electrons are injected into the electroactive polymer composition and the electrons react with water to release hydrogen gas and to produce hydroxide ions as described in reaction B:

$$2H_2O + 2e^- \rightarrow H_2 + 2OH^- \qquad (B)$$

The increase in the hydroxide ion content increases the pH around the cathode.

Swelling of the electroactive polymer composition occurs when the hydrogen ions generated at the anode protonate functional groups, such as amine groups, in the polymer chain of the pH-responsive polymer, causing electrostatic repulsion of the protonated groups and spreading of the polymer chain apart. The protonated groups on the polymer chain attract anions from the electrolyte towards them, and the anions additionally attract protonated groups of neighboring polymer chains, thereby facilitating further spreading of the polymer chains and hence further swelling of the electroactive polymer composition, which increases the total volume of the electroactive polymer composition. The electrolyte can serve as a salt bridge to balance charges within the electrolytic cell.

The tactile key is initially in a rest position, or in an "off" state, in which the conductive coating (top electrode) and the conductive layer (bottom electrode) are not in electrical communication with one another. When in the rest position, the conductive coating (top electrode) forms an open circuit with the conductive layer (bottom electrode). When the tactile key is depressed, the conductive coating (top electrode) forms a closed circuit with the conductive layer (bottom electrode). When the circuit is closed, the electroactive polymer composition can deform or bend as a result of displacement of ions (where the electroactive polymer composition contains ionic electroactive polymers), or swell as a result of electrochemical reactions which generate hydrogen ions (where the electroactive polymer composition contains pH-responsive polymers), as described above.

A power source can be connected to the conductive coating (top electrode) and to the conductive layer (bottom electrode), for example, by having a wire run from a positive terminal of a battery to one electrode and then an additional wire run from a negative terminal of a battery to the other electrode to form a circuit. A switch can be configured within the circuit such that the switch is "opened" when the tactile key is in the rest position, and the switch is "closed" when the tactile key is depressed. The porous layer on the conductive layer (bottom electrode) partitions the electrolytic cell into a zone of low pH near the positive terminal (anode) and high pH near the negative terminal (cathode). Accordingly, the portion of the electroactive polymer composition that is between the positive terminal (anode) and the porous layer (for example, in the low pH zone) when the circuit is closed, may expand in volume or bend when the tactile key is depressed. When the tactile key is released, the circuit becomes opened, and the electroactive polymer composition shrinks in volume or returns to its original state. The shrinking or reverting to the original state can be accelerated by reversing the current flow through the electrolytic cell. For example, if the top and bottom electrodes are placed under reverse bias, with the electroactive polymer composition placed in between the cathode (negative terminal) and the porous layer, the rate of shrinking of the electroactive polymer composition can be greater than if the circuit were simply opened.

The conductive layer (bottom electrode) can be disposed on the substrate in discrete regions such that each electrolytic cell (tactile key) can be addressed independently. For example, when one tactile key on a keyboard is depressed, only the depressed key will swell and the remaining tactile keys do not swell.

Figure 1:
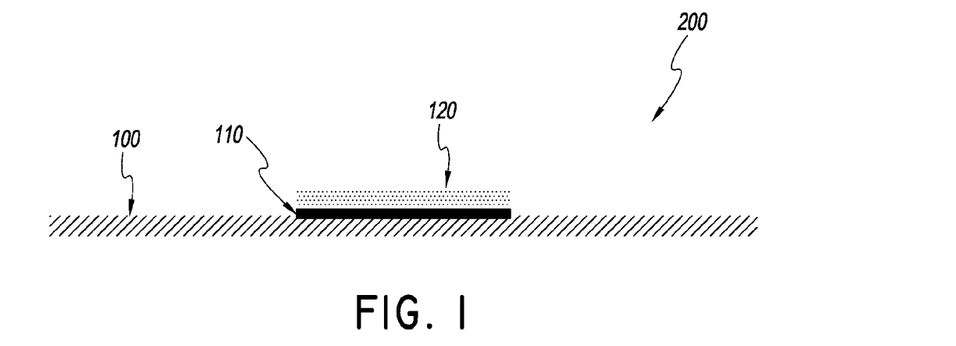
FIG. 1 is a cross-sectional view of a portion of a tactile key having a substrate, a conductive layer disposed on a region of the substrate, and a porous layer disposed on at least a portion of the conductive layer, in accordance with some embodiments.
Figure 2:
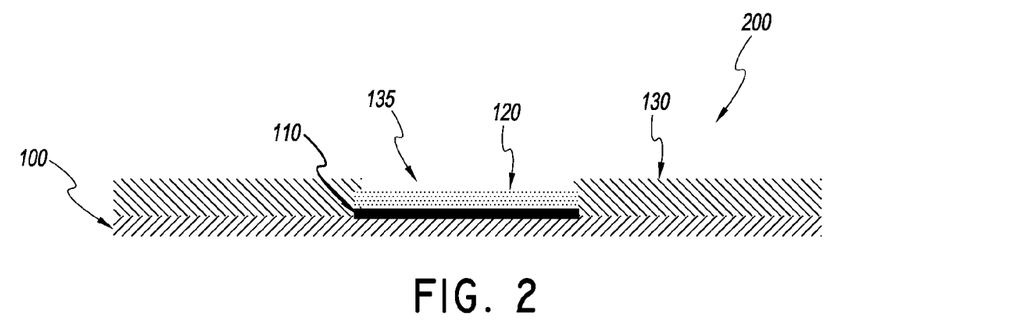
FIG. 2 shows the portion from FIG. 1, and an insulating layer disposed on regions of the substrate that surround the conductive layer and the porous layer to form a well, in accordance with some embodiments.
Figure 3:
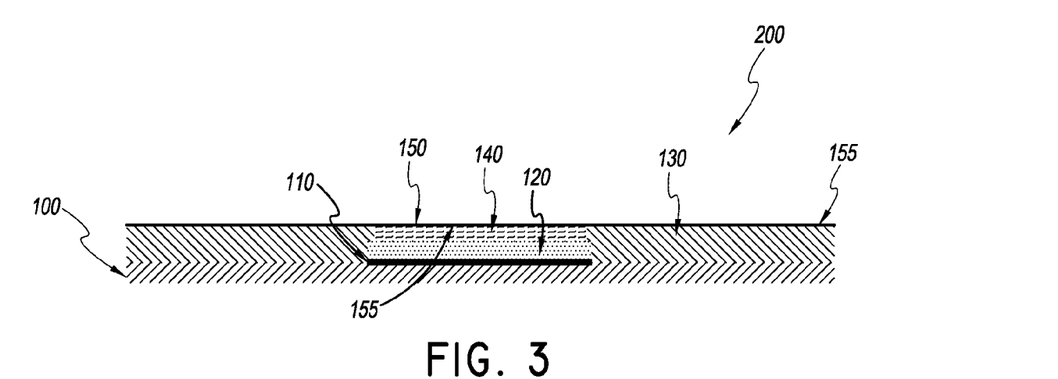
FIG. 3 shows the portion from FIG. 2, an electroactive polymer composition disposed in the well, and a flexible layer covering the well and at least a portion of the insulating layer, in accordance with some embodiments.

Some embodiments disclosed herein relate to a tactile key. FIGS. 1 to 3 are cross-sectional views of various stages of formation of a tactile key in accordance with some embodiments. FIG. 1 is a cross-sectional, side view of a portion of a tactile key 200 which includes a substrate 100, a conductive layer 110 disposed on a region of the substrate 100, and a porous layer 120 disposed on the conductive layer 110. In some embodiments, the substrate 100 is rigid. In some embodiments, the rigid substrate 100 has a Young's Modulus of about 130 MPa to about 185 MPa, including about 130 MPa, about 135 MPA, about 140 MPa, about 145 MPa, about 150 MPa, about 155 MPa, about 160 MPa, about 165 MPa, about 170 MPa, about 175 MPa, about 180 MPa, about 185 MPa, or a value between any two of these values. In some embodiments, the substrate 100 includes glass, silicon, plastic, stainless steel, or any combination thereof. In some embodiments, the substrate includes plastic and silicon. In some embodiments, the substrate 100 is a vacuum compatible material. A vacuum compatible material may be any material that can be processed in a vacuum equipment such as vacuum ovens, plasma etch and deposition equipment, sputter or evaporation chambers, or any equipment that operates at a pressure of less than about 5 Torr (about 667 Pa), without significant mechanical deformation or outgassing.

In some embodiments, the conductive layer 110 is a metallic conductor. In some embodiments, the metallic conductor is aluminum, gold, molybdenum, silver, tungsten, titanium, copper, or any combination thereof. In some embodiments, the conductive layer is aluminum. Other than metallic conductors, the conductive layer 110 may alternatively be other electrically conductive materials. In some embodiments, the conductive layer 110 is indium tin oxide, indium gallium zinc oxide, zinc oxide, poly(3,4-ethylenedioxythiophene) (PEDOT), carbon nanotubes, or a combination thereof. The conductive layer may be formed on the substrate by sputtering, chemical vapor deposition, or solution deposited. Depending on the material of the conductive layer 110, the conductive layer 110 may be transparent to light. For example, transparent materials the conductive layer 110 may include indium tin oxide, indium gallium zinc oxide, zinc oxide, PEDOT, and carbon nanotubes. The conductive layer 110 can have a low electrical resistivity. In some embodiments, the conductive layer 110 has an electrical resistivity equal to or less than about 0.003 Ohm-cm, including about 0.003 Ohm-cm, about 0.0028 Ohm-cm, about 0.0026 Ohm-cm, about 0.0024 Ohm-cm, about 0.0022 Ohm-cm, about 0.002 Ohm-cm, or an electrical resistivity between any two of these values.

The conductive layer 110 can be disposed on at least one region of the substrate 100. For example, the conductive layer 110 may be disposed on one or more portions of a surface of the substrate 100, or an entire surface of the surface of the substrate 100. The size and shape of the conductive layer 110 is not limited. In some embodiments, the conductive layer 110 has a size and shape that correspond to a keyboard feature. In some embodiments, providing the conductive layer 110 on at least one region of the substrate includes patterning the conductive layer into a size and shape that correspond to a keyboard feature. For example, the conductive layer 110 can be patterned with conventional photolithography to form the desired size and shape. The keyboard feature can for example be an alphabet key, a number key, a space bar, or any other keys of the keyboard.

The porous layer may form a membrane for the electroactive polymer composition to retreat into when the tactile key is in a rest position, or in an "off" state, that is, when the tactile key is not depressed. In some embodiments, the porous layer 120 is micro-porous. For example, the porous layer can be a micro-porous membrane. The porous layer can have pores with an average diameter of about 0.005 µm to about 0.02 µm, including about 0.005 µm, about 0.010 µm, about 0.015 µm, about 0.02 µm, or any diameter between any of these values. In some embodiments, the porous layer 120 has a thickness of at least about 50 µm, including about 60 µm, about 70 µm, about 80 µm, about 90 µm, about 100 µm, a thickness between any of these values, or more. In some embodiments, the porous layer 120 includes an oxidized portion of the conductive layer, an etched portion of the conductive layer, or both. For example, where the conductive layer 110 is aluminum, the porous layer can be aluminum oxide, etched aluminum, or both.

In some embodiments, providing the porous layer 120 on the conductive layer 110 includes modifying at least a portion of the conductive layer 110. The modifying step may include oxidizing at least a portion of the conductive layer 110, etching at least a portion of the conductive layer 110, or both. For example, where the conductive layer 110 is oxidized to form the porous layer 120, the conductive layer can be a metal and the porous layer 120 can be a metal oxide; and where the conductive layer 110 is etched to form the porous layer 120, the conductive layer can be a metal and the porous layer 120 can be an etched metal. In some embodiments, the modifying step includes anodically oxidizing at least a portion of the conductive layer 110 to form a porous metal oxide layer 120. The thickness of porous layer 120 can be controlled so that at least a portion of the conductive layer 110 is not consumed during the oxidation or etching process. For example, the etching or the oxidizing can be controlled so that at least a portion of the conductive layer 110 remains intact, and not all of the conductive layer 110 becomes porous. In some embodiments, the oxidizing step includes controlling the oxidation of the conductive layer so that at least a portion of the conductive layer is not oxidized. In some embodiments, the etching step includes controlling the etching of the conductive layer so that at least a portion of the conductive layer is not etched. As an alternative to etching or oxidizing the conductive layer 110 to form the porous layer 120, the porous layer can be separately formed and applied onto the conductive layer 110. In some embodiments, providing the porous layer 120 comprises applying the porous material onto the conductive layer 110.

FIG. 2 is a cross-sectional, side view of the portion of the tactile key 200 from FIG. 1 with an insulating layer 130 disposed on a region of a surface of the substrate 100 that surrounds the conductive layer 110 and the porous layer 120 to form a well 135. In some embodiments, the insulating layer 130 is non-porous. In some embodiments, the insulating layer 130 is an organic polymer. The organic polymer, in some embodiments, is a photoresist, BCB, SU-8, MX5000 dry film negative photoresist, or any combination thereof. In some embodiments, the insulating layer is SU-8 and BCB. The insulating layer 130 can be provided onto the substrate by laminating the insulating layer 130 onto the substrate 100, spin casting the insulating layer 130 onto the substrate 100, extruding the insulating layer 130 onto the substrate 100, spraying the insulating layer 130 onto the substrate 100, or patterning the insulating layer 130 onto the substrate 100 by photolithography. The insulating layer 130, when provided on the substrate, can be patterned into the well 135. In some embodiments, the insulating layer 130 may be patterned into the well using conventional photolithography techniques or other methods as described above. The insulating layer 130 can, in some embodiments, be at least about 50 micrometers thick, or of a thickness that can form the well 135 having a depth sufficient to incorporate an electroactive polymer composition as will be described below with reference to FIG. 3. For example, the insulating layer 130 can have a thickness of about 50 micrometers, about 60 micrometers, about 70 micrometers, about 80 micrometers, about 90 micrometers, about 100 micrometers, or a thickness between any two of these values.

FIG. 3 is a cross-sectional, side view of the portion of tactile key 200 from FIG. 2 but with the electroactive polymer composition 140 disposed in the well 135, and a flexible layer 150 having a conductive coating 155 on at least a portion of a surface facing the electroactive polymer composition 140. In some embodiments, the electroactive polymer composition 140 resides in at least a portion of the well 135, at least a portion of pores within the porous layer 120, or both. The electroactive polymer composition may include one or more electroactive polymers. In some embodiments, the electroactive polymer composition 140 includes one or more ionic electroactive polymers. The one or more ionic electroactive polymers may include Nafion®, Flemion®, or any combination thereof. Nafion® is a registered trademark of E. I. DU PONT DE NEMOURS AND COMPANY, Delaware, USA, and is produced by the company under the registered trademark. Flemion® is a registered trademark of ASAHI GLASS COMPANY, Tokyo, Japan, and is produced by the company under the registered trademark. The ionic electroactive polymer may be embedded with additives to improve material properties. For example, silver particles may be embedded into the ionic electroactive polymer to increase range of deformation of the polymer in response to an applied electric field. In some embodiments, the electroactive polymer composition 140 includes one or more pH-responsive polymers and one or more electrolytes. The one or more pH-responsive polymers can include polyoxypropylenetriamine, polyethylene glycol diglycidyl ether, chitosan, polyacrylic acid, or any combination thereof. The one or more electrolytes may be in aqueous form. The one or more electrolytes may include sodium acetate, NaCl, $NaClO_4$, $Na_2SO_4$, $Na_2CO_3$, $NH_4COOH$, $NaHCO_3$, and $NH_4HCO_3$, or any combination thereof. The electroactive polymer composition 140 can be added to the well 135 using various methods. In some embodiments, the electroactive polymer composition 140 is added to the well 135 using an inkjet printer. In some embodiments, the electroactive polymer composition 140 is added to the well 135 using a syringe. The electroactive composition 140 may be in a semi-liquid state or in a liquid state during the adding. Depending on the type of electroactive polymers present in the composition 140, the electroactive polymer 140 may be in a semi-liquid state or in a liquid state after the adding (for example, for some pH responsive polymers), or the electroactive polymer composition 140 may at least partially solidify or solidify after the adding (for example, for some ionic electroactive polymers).

The flexible layer 150 covers the well 135 and at least a portion of the insulating layer 130 surrounding the well 135. In some embodiments, the flexible layer 150 includes polyethylene terephthalate, polyethylene naphthalate, polyimide or any combination thereof. In some embodiments, the flexible layer 150 is polyethylene terephthalate. For example, the well 135 and at least a portion of the insulating layer 130 can be covered with the polyethylene terephthalate film. The flexible layer 150, in some embodiments, may be about 25 microns to about 125 microns thick, including about 25 microns, about 35 microns, about 45 microns, about 55 microns, about 65 microns, about 75 microns, about 85 microns, about 95 microns, about 105 microns, about 115 microns, about 125 microns, or a thickness between any two of these values. In some embodiments, at least a portion of, or an entire surface of, the flexible layer 150 is coated with the conductive coating 155. In some embodiments, the conductive coating is indium tin oxide, zinc oxide, indium zinc oxide, gold, silver, aluminum, nickel, molybdenum, tungsten or any combination thereof. In some embodiments, the conductive coating 155 can be indium tin oxide (ITO). The conductive coating 155 may be formed on the flexible layer 150 by sputtering, chemical vapor deposition, or solution deposition. In some embodiments, the conductive layer 110 is configured as an electrode and the conductive coating 155 of the flexible layer 150 is configured as a counter electrode. In some embodiments, covering the well and at least a portion of the insulating layer surrounding the well with the flexible layer includes adhering the flexible layer to the insulating layer. The flexible layer may be adhered to the insulating layer using any known adhesive, for example, an epoxy.

The tactile key as described herein can be incorporated into a keyboard, for example, in the form of a touch pad having one or more tactile keys. The tactile key can also be incorporated into devices in general or devices that include or use keyboards. For example, a substrate as described herein can be provided with a conductive layer as described herein on one or more regions of the substrate. The quantity and location of the one or more regions would be dependent on the pre-determined number of the tactile keys and the pre-determined locations of the tactile keys on the keyboard. For example, a keyboard that is designed to swap between a 26-key alphabetic keyboard and a 12-key numeric keypad can have enough regions, presumably 26, to perform both functions. For small scale keyboards, the conductive layer can be a conductor that is transparent to light such as ITO. For larger keyboards, the conductive layer can be a low resistivity metal such as aluminum to minimize resistance/capacitance (RC) losses. Small scale keyboards may be better suited with transparent conductors as the conductive layer, while large scale ones are better suited with low resistivity metals as the conductive layer. This is because the line resistance (resulting from transparent conductors) becomes significant for larger keyboards as the electricity must travel a longer distance. For higher current applications however, transparent conductors may be suitable for larger keyboards. The conductive layer on each region of the substrate can be patterned into a shape that represents the size of the respective tactile key on the keyboard.

EXAMPLES

Example 1: Tactile Key with pH-Responsive Polymers

A tactile key is provided. The tactile key has a rigid substrate made of glass. An aluminum conductive layer is disposed on regions of the glass substrate by sputtering. The conductive layer on each region may have an electrical resistivity of 0.003 Ohm-cm, and is patterned into a size and shape that corresponds to each key of a keyboard. Disposed on the conductive layer is an aluminum oxide porous layer having pores with an average diameter of about 0.012 µm. The porous layer is created on the conductive layer by anodically oxidizing at least a portion of the conductive layer. The areas on the substrate that surround the conductive layer and the porous layer are provided with a non-porous SU-8 insulating layer using photolithography technique to form a well. The well has sidewalls defined by the insulating layer, and a bottom surface defined by the porous layer. The thickness of the insulating layer is about 55 micrometers thick. The well is filled with an electroactive polymer composition by injecting the composition into the well with a syringe. The electroactive polymer composition includes polyoxypropylenetriamine, polyethylene glycol diglycidyl ether, and aqueous sodium acetate (electrolyte). The well and portions of the insulating layer surrounding the well are covered with a flexible layer made of polyethylene teraphthalate, and having a thickness of about 75 micrometers. Before assembly, an indium tin oxide conductive coating is formed on the flexible layer by sputtering. The flexible layer the covers the well by gluing to portions of the insulating layer surrounding the well using an epoxy. When assembled, the conductive coating faces and contacts the electroactive polymer composition. The conductive layer is configured as an electrode (cathode), and the conductive coating is configured as a counter electrode (anode). The electrode and the counter electrode are electrically connected to a battery to form a circuit. A switch is included in the circuit and arranged such that the switch is "opened" when the tactile key is in a rest position and "closed" when the tactile key is depressed.

Example 2: Tactile Key with Ionic Electroactive Polymers

A tactile key is provided. The tactile key has a rigid substrate made of glass. A carbon nanotube conductive layer is disposed on regions of the glass substrate by solution deposition. The conductive layer on each region may have an electrical resistivity of $10^{-4}$ Ohm-cm, and is patterned into a size and shape that corresponds to each key of a keyboard. The areas on the substrate that surround the conductive layer are provided with a non-porous SU-8 insulating layer using photolithography technique to form a well. The well has sidewalls defined by the insulating layer, and a bottom surface defined by the porous layer. The thickness of the insulating layer is about 55 micrometers thick. The well is filled with an electroactive polymer composition by injecting the composition into the well with a syringe. The electroactive polymer composition can be silver embedded Nafion®. The well and portions of the insulating layer surrounding the well are covered with a flexible layer made of polyethylene teraphthalate, and having a thickness of about 75 micrometers. Before assembly, an indium tin oxide conductive coating is formed on the flexible layer by sputtering. The flexible layer covers the well by gluing to portions of the insulating layer surrounding the well using an epoxy. When assembled, the conductive coating faces and contacts the electroactive polymer composition. The conductive layer is configured as an electrode (cathode), and the conductive coating is configured as a counter electrode (anode). The electrode and the counter electrode are electrically connected to a battery to form a circuit. A switch is included in the circuit and arranged such that the switch is "opened" when the tactile key is in a rest position and "closed" when the tactile key is depressed.

Example 3: Variation of Tactile Key from Example 2

A tactile key is provided having the same structural configuration as that described in Example 2, but with different materials and dimensions for some of the components that make up the tactile key. In this Example, the substrate is a combination of plastic and silicon, the conductive layer is made up of indium gallium zinc oxide, the insulating layer is a combination of SU-8 and BCB, the flexible layer is made of polyimide, and the conductive coating on the flexible layer is molybdenum. The components described herein are formed using the methods described in Example 2. The electroactive polymer composition is similar to that in Example 2. The thickness of the insulating layer is about 80 micrometers, and the thickness of the flexible layer is about 125 micrometers.

Example 4: Variation of Tactile Key from Example 1

A tactile key is provided having the same structural configuration as that described in Example 1, but with different materials and dimensions for some of the components that make up the tactile key. In this Example, the substrate is stainless steel, the conductive layer is made up of titanium, the porous layer is titanium oxide, the insulating layer is a MX5000 dry film negative photoresist, the flexible layer is made of polyimide, and the conductive coating on the flexible layer is indium tin oxide. The components described herein are formed using the methods described in Example 1. The electroactive polymer composition is similar to that in Example 1. The thickness of the insulating layer is about 85 micrometers, and the thickness of the flexible layer is about 25 micrometers.

Example 5: Using a Device with Tactile Keys of Examples 1 and 4

A method of using the tactile key of Example 1 and 4 will be described herein.

A device with 84 tactile keys is produced using the method of Example 1, by repeating the method for each of the 84 tactile keys to form a keyboard.

When one of the tactile keys is pressed by a user's finger, the conductive coating (counter electrode or anode) of the flexible layer forms a closed circuit with the conductive layer (electrode or cathode). The pH decreases at the anode, which is the positive terminal, as the anode pulls electrons out of water forming oxygen gas and hydrogen ions. The decrease in pH causes the electroactive polymer composition to expand towards the flexible layer, thereby generating a tactile feel of resistance.

When the tactile key is released, the electric field is removed, thereby resetting the tactile key to "rest" position. In the rest position, the circuit formed between the electrode and the counter electrode becomes incomplete. The electroactive polymer composition collapses back to its original volume.

Example 6: Using a Device with Tactile Keys of Examples 2 and 3

A method of using the tactile key of Example 2 and 3 will be described herein.

A device with 84 tactile keys is produced using the method of Example 2, by repeating the method for each of the 84 tactile keys to form a keyboard.

When one of the tactile keys is pressed by a user's finger, the conductive coating (counter electrode or anode) of the flexible layer forms a closed circuit with the conductive layer (electrode or cathode). The electric field generated across the electroactive polymer composition causes cations to migrate towards the counter electrode (anode), thereby causing the portion of the electroactive polymer nearer the counter electrode to move toward the flexible layer by bending. The bending of the electroactive polymer forms a curved surface that exerts a force onto the flexible layer, thereby generating a tactile feel of resistance.

When the tactile key is released, the electric field is removed, thereby resetting the tactile key to "rest" position. In the rest position, the circuit formed between the electrode and the counter electrode becomes incomplete. The electroactive polymer composition reverts back to its original state.

The Examples 1 to 6 above describe various configurations of tactile keys and methods of making and using the tactile keys. As demonstrated by the Examples, the tactile keys can provide tactile cues to the user when the user depresses each key thereby reducing errors when selecting keys on keypads such as touchscreen keypads as well as improving the user's experience with the device.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and so on). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, and so on" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and so on). In those instances where a convention analogous to "at least one of A, B, or C, and so on" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, and so on). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and so on. As a non-limiting example, each range discussed herein can be readily broken down into a lower third, middle third and upper third, and so on. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A tactile key comprising:
   a substrate;
   a conductive layer disposed on at least one region of the substrate;
   a porous layer disposed on at least a portion of the conductive layer;
   an insulating layer disposed on regions of the substrate that surround the conductive layer and the porous layer to form a well, wherein the well comprises sidewalls defined by the insulating layer, and a bottom surface at least partially defined by the porous layer;
   an electroactive polymer composition disposed in the well; and
   a flexible layer that includes a conductive coating on at least a portion of a surface that faces the electroactive polymer composition, wherein the flexible layer covers the well and at least a portion of the insulating layer that surrounds the well.

2. The key of claim 1, wherein the substrate comprises glass, silicon, plastic, stainless steel, or any combination thereof.

3. The key of claim 1, wherein the conductive layer comprises a metallic conductor selected from aluminum, gold, molybdenum, silver, tungsten, titanium, copper, or any combination thereof.

4. The key of claim 1, wherein the conductive layer comprises indium tin oxide, indium gallium zinc oxide, zinc oxide, poly(3,4-ethylenedioxythiophene) (PEDOT), carbon nanotubes, or any combination thereof.

5. The key of claim 1, wherein the porous layer comprises an oxidized portion of the conductive layer, an etched portion of the conductive layer, or both.

6. The key of claim 1, wherein the insulating layer comprises an organic polymer selected from a photoresist, BCB, SU-8, MX5000 dry film negative photoresist, or any combination thereof.

7. The key of claim 1, wherein the electroactive polymer composition resides in at least a portion of the well, at least a portion of pores within the porous layer, or both.

8. The key of claim 1, wherein the electroactive polymer composition comprises one or more electroactive polymers.

9. The key of claim 1, wherein the electroactive polymer composition comprises one or more pH-responsive polymers, and one or more electrolytes.

10. The key of claim 1, wherein the electroactive polymer composition comprises one or more ionic electroactive polymers.

11. The key of claim 1, wherein the flexible layer comprises polyethylene terephthalate, polyethylene naphthalate, polyamide, or any combination thereof.

12. The key of claim 1, wherein the conductive layer is configured as an electrode and the conductive coating of the flexible layer is configured as a counter electrode.

13. A method to produce a tactile key, the method comprising:
providing a conductive layer on at least one region of a substrate;
providing a porous layer on at least a portion of the conductive layer;
providing an insulating layer on regions of the substrate that surround the conductive layer and the porous layer to form a well, wherein the well comprises sidewalls defined by the insulating layer, and a bottom surface at least partially defined by the porous layer;
adding an electroactive polymer composition to the well; and
covering the well and at least a portion of the insulating layer that surrounds the well with a flexible layer, wherein the flexible layer includes a conductive coating on at least a portion of a surface that faces the electroactive polymer composition.

14. The method of claim 13, wherein the conductive layer comprises a metallic conductor selected from aluminum, gold, molybdenum, silver, tungsten, titanium, copper, or any combination thereof.

15. The method of claim 13, wherein the conductive layer comprises indium tin oxide, indium gallium zinc oxide, zinc oxide, poly(3,4-ethylenedioxythiophene) (PEDOT), carbon nanotubes, or a combination thereof.

16. The method of claim 13, wherein providing the porous layer comprises modifying at least the portion of the conductive layer.

17. The method of claim 16, wherein modifying at least the portion of the conductive layer comprises oxidizing at least the portion of the conductive layer, etching at least the portion of the conductive layer, or both.

18. The method of claim 13, wherein providing the porous layer comprises applying a porous material onto the conductive layer.

19. The method of claim 13, wherein the insulating layer comprises an organic polymer selected from a photoresist, BCB, SU-8, MX5000 dry film negative photoresist, or any combination thereof.

20. The method of claim 13, wherein providing the insulating layer comprises laminating the insulating layer onto the substrate, spin casting the insulating layer onto the substrate, extruding the insulating layer onto the substrate, spraying the insulating layer onto the substrate, or patterning the insulating layer onto the substrate by photolithography.

21. The method of claim 13, wherein adding the electroactive polymer composition to the well comprises adding the electroactive polymer composition to the well using an inkjet printer or a syringe.

22. The method of claim 13, wherein the electroactive polymer composition comprises one or more electroactive polymers.

23. The method of claim 13, wherein the electroactive polymer composition comprises one or more pH-responsive polymers and one or more electrolytes.

24. The method of claim 13, wherein the electroactive polymer composition comprises one or more ionic electroactive polymers.

25. The method of claim 13, wherein the conductive layer is configured as an electrode and the conductive coating of the flexible layer is configured as a counter electrode.

26. A method to provide a tactile feedback with a device that comprises at least one tactile key, the method comprising:
providing the at least one tactile key, wherein the at least one tactile key comprises:
a substrate;
a conductive layer disposed on at least one region of the substrate;
a porous layer disposed on at least a portion of the conductive layer;
an insulating layer disposed on regions of the substrate that surround the conductive layer and the porous layer to form a well, wherein the well comprises sidewalls defined by the insulating layer, and a bottom surface at least partially defined by the porous layer;
an electroactive polymer composition disposed in the well; and
a flexible layer that includes a conductive coating on at least a portion of a surface that faces the electroactive polymer composition, wherein the flexible layer covers the well and at least a portion of the insulating layer that surrounds the well,
forming a closed circuit between the conductive coating of the flexible layer, and the conductive layer in response to depression of the at least one tactile key;
activating an electric field across the electroactive polymer composition of the tactile key in response to formation of the closed circuit, and
responsive to the activated electric field; urging the electroactive polymer composition disposed in the well to move towards the flexible layer to provide the tactile feedback.

27. The method of claim 26, further comprising releasing the at least one tactile key to deactivate the electric field, wherein deactivation of the electric field causes the electroactive polymer composition to move away from the flexible layer.

* * * * *

UNITED STATES PATENT AND TRADEMARK OFFICE
CERTIFICATE OF CORRECTION

| | |
|---|---|
| PATENT NO. | : 9,851,796 B2 |
| APPLICATION NO. | : 14/482958 |
| DATED | : December 26, 2017 |
| INVENTOR(S) | : Marrs et al. |

Page 1 of 1

It is certified that error appears in the above-identified patent and that said Letters Patent is hereby corrected as shown below:

In the Claims

In Column 16, Line 46, in Claim 26, delete "tactile key;" and insert -- tactile key, --, therefor.

Signed and Sealed this
Twenty-fourth Day of April, 2018

Andrei Iancu
*Director of the United States Patent and Trademark Office*